March 7, 1967 R. R. HARRISON 3,307,356
HYDRAULIC MOTION TRANSMITTING SYSTEM
Filed Jan. 13, 1965 2 Sheets-Sheet 1
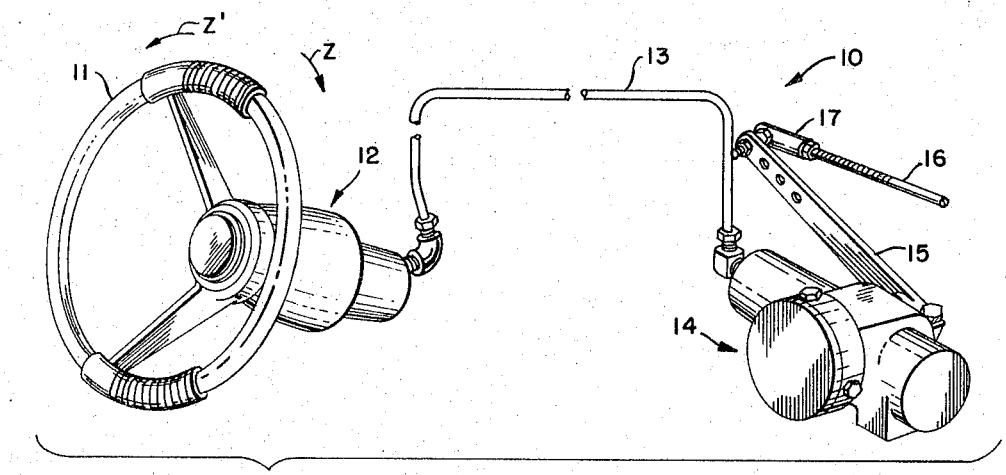
Fig. 1
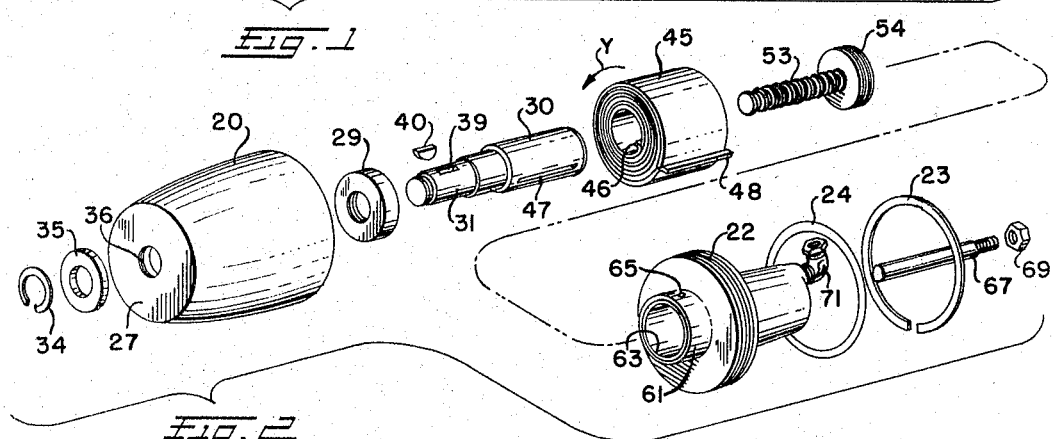
Fig. 2
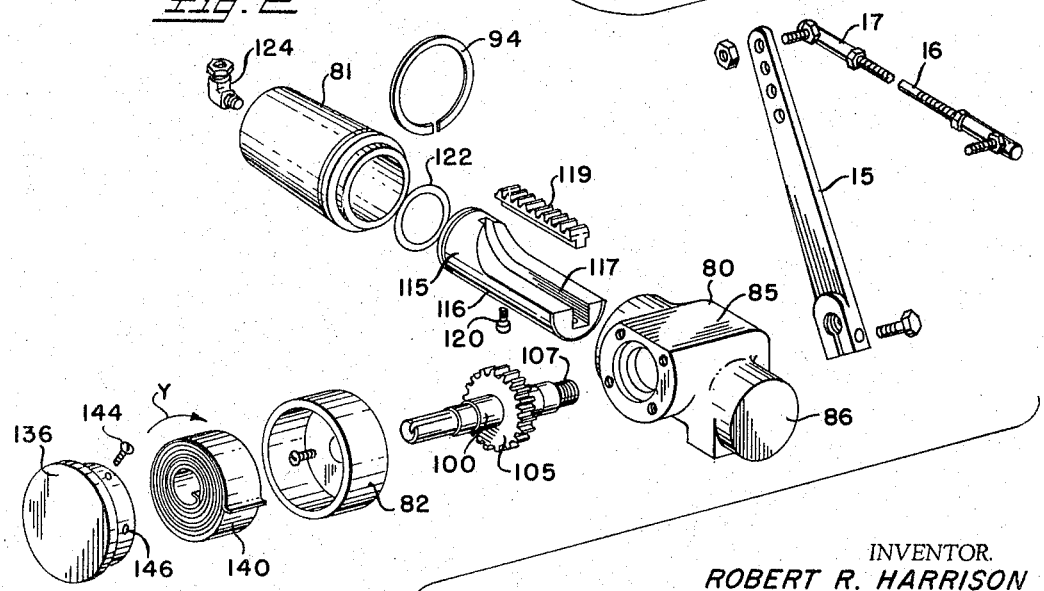
Fig. 3
INVENTOR.
ROBERT R. HARRISON
BY
ATTORNEYS

INVENTOR.
ROBERT R. HARRISON
BY
ATTORNEYS

United States Patent Office 3,307,356
Patented Mar. 7, 1967

3,307,356
HYDRAULIC MOTION TRANSMITTING SYSTEM
Robert R. Harrison, 713 La Grange Road,
Elyria, Ohio 44035
Filed Jan. 13, 1965, Ser. No. 425,316
7 Claims. (Cl. 60—54.5)

This invention relates to remote control devices in general and more particularly to an hydraulic motion transmitting system comprising an actuating, master component and an actuated, slave component. As herein illustrated and described, the invention is disclosed as adapted for steering small watercraft, such as motorboats and the like, but it will be understood that the invention is not limited to such use, and many other applications of the device will be readily apparent.

In remote motion control systems, particularly where they are used for steering purposes, it is highly desirable that the driver or helmsman retain the "feel" of the motion and direction of the vehicle, vessel, or the like, which said feel is fed back through the control system and represents the resistance of the steered apparatus to deflection from a straight forward course. However, it is also desirable to eliminate the usual reversing forces or severe backlash which is normal to a mechanical connection between the actuating component and the actuated component. It is further preferred that the system be flexible with regard to placement and routing of the transmitting means, such flexibility not being possible with straight-line drives such as shafts and gears, cables and pulleys, or the like. It is accordingly, a general object of this invention to provide a motion transmitting system suitable for application as a remote steering means wherein the feed-back feel is retained, the backlash is substantially eliminated, and the transmission means is highly flexible as to placement and routing.

It is another object of this invention to provide a motion transmitting system having the above features and characteristics wherein means are provided for multiplying the force applied at the actuating component.

Another object of the invention is to provide means for transmitting power between widely separated control components without the use of mechanical connections.

Still another object is to provide a motion transmitting system as set forth above wherein the actuating and actuated components are completely enclosed and self-lubricating.

Yet another object is to provide an hydraulic motion transmitting system having means for automatically purging entrapped air in the system without the use of external valves or the like.

A further object is to provide a motion transmitting system as set forth above having a driving shaft and a remotely actuated driven shaft, each said shaft having means biasing it in a rotative direction opposite to the other shaft, and hydraulic transmission means connecting said shafts whereby rotation of the driving shaft effects a corresponding rotation of the driven shaft.

Still another object is to provide such a system wherein the biasing means comprise clock type coil springs surrounding said shafts and prewound to a predetermined torque in opposite rotative directions.

Other objects of the invention and a number of its advantages will be readily understood from the following description of one embodiment of the invention as illustrated in the accompanying drawings:

FIGURE 1 is a perspective view of the hydraulic motion transmitting system of this invention;

FIGURE 2 is an exploded, perspective view of the actuating, master component of this invention;

FIGURE 3 is an exploded, perspective view of the actuated, slave component of this invention;

Figure 4:
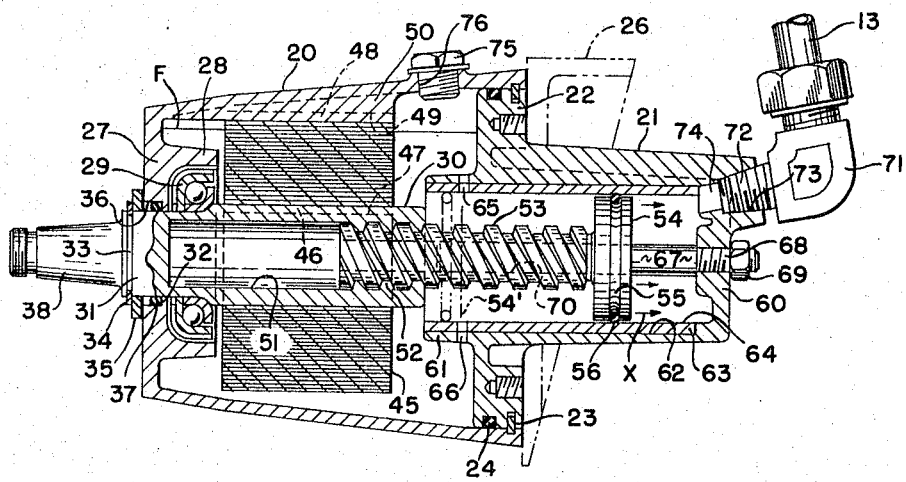
FIGURE 4 is a longitudinal section through the master component in its assembled condition.

Referring now to the drawings in all of which like parts are designated by like reference numerals and particularly to FIGURE 1, the hydraulic motion transmitting system of this invention, as herein disclosed, is embodied in a steering means 10 adapted for use in a small watercraft. Said steering means comprises a steering wheel 11, a master component 12, an hydraulic connecting line 13, a slave component 14, a control arm 15, and a steering rod 16. The steering wheel 11 is mounted to the master component 12, which said master component responds to the turning of said wheel in such manner as to effect movement of pressurized fluid carried by the connecting line 13. The slave component 14 responds to the movement of the fluid and transmits this response to the control arm 15. The distal end of said control arm is connected to one end of the steering rod 16 by means of a ball joint assembly 17 whereby pivotal movement of said control arm results in generally longitudinal movement of said steering rod. The opposite end of the steering rod 16 is connected to the craft's rudder (not herein illustrated), and it will be readily understood that said steering rod could be connected to the wheels of a vehicle or to any other mechanical device subject to remote steering or control.

In the general application and operation of the steering means, the details of which are hereinafter fully disclosed, a turn of the wheel 11 in the clockwise direction, as illustrated, causes the control arm 15 to pivot clockwise and the steering rod 16 to move toward the right; a turn of said wheel in the counterclockwise direction correspondingly causes the control arm to pivot counter-clockwise and the steering rod to move toward the left. The connecting line 13 is preferably flexible whereby it may be easily routed along any desired path between the master component and the slave component.

Referring now particularly to FIGURES 2 and 4, the master component 12 comprises, basically, a reservoir housing 20 of generally frusto-conical shape carrying a coaxial cylinder housing 21 at one end thereof. The cylinder housing 21 has a radial flange 22 which interfits the larger end of the reservoir housing 20 and is retained therein by a snap ring 23. The flange 22 is provided with a circumferentially continuous, radially outwardly opening groove 24 in which an O-ring 25 is seated for sealing the cylinder housing in the reservoir housing. Both housings are mounted in any suitable manner to a bracket or dashboard 26 (FIGURE 4) in the cockpit or wheelhouse of the craft.

The smaller end of the reservoir housing 20 has an integral end wall 27, which said end wall has an inwardly directed, annular flange 28 seating a thrust-radial bearing 29. A drive shaft 30 having a reduced neck 31 is disposed within the reservoir housing 20 with said neck projecting outwardly through the bearing 29 and a suitable aperture 32 in the center of the end wall 27. Outwardly of the end wall 27, the neck 31 is circumferentially grooved at 33 and seats a snap ring 34 which retains a washer 35 against the outer face of said end wall. A recess 36 is provided in the outer surface of the end wall 27 around the neck 31, and an O-ring seal 37 is disposed in said recess for sealing the drive shaft 30 to the reservoir housing 20. Outwardly beyond the neck 31, said drive shaft has a further reduced, frusto-conical mounting portion 38 having a threaded end portion 38a, which said mounting portion is provided with a key slot 39 and a key 40 for securing the steering wheel 11 thereto in a well-known manner.

The drive shaft 30 is rotatable by means of the wheel 11 and is surrounded, inside the reservoir housing 20, with a coiled, clocktype spring 45 made of flat sheet metal. The spring 45 has a radially inwardly turned lip 46 at its inner end which is seated in a slot 47 in the drive shaft 30. Said spring also has a radially outwardly projecting lip 48 which is seated in a slot 49 of an inwardly projecting boss 50 of the housing 20. The spring 45 is prewound to a determined torque in a clockwise direction whereby counterclockwise rotation of the wheel 11 unwinds the spring, and clockwise rotation of said wheel winds it more tightly.

A coaxial bore 51 is provided in the drive shaft 30, said bore opening at the inner end of said shaft and being provided with inwardly projecting threads 52 adjacent to its open end. A worm shaft 53 is engaged by the threads, 52, said worm shaft carrying a piston 54 at the end thereof within the cylinder housing 21. Said piston is provided with a circumferentially continuous groove 55 seating an O-ring 56 and is reciprocated within said cylinder housing 21 when the wheel 11 is rotated alternately clockwise and counterclockwise, causing the worm shaft 53 to move in a direction towards and into the bore 51 when said wheel is turned clockwise and to move outwardly of said bore when the wheel is turned counterclockwise. This arrangement also provides for a multiplication of forces applied at the wheel for turning the rudder or other steering element.

The cylinder housing 21 has an integral end wall 60 at its distal end and an annular collar 61 which projects beyond the radial flange 22 into the reservoir housing 20. A bore 62 extends from the end wall 60 through said collar and seats a liner sleeve 63. Said sleeve defines a cylinder 64 into which the piston 54 is fitted, said piston being sealed relative to the cylinder by the O-ring 56. Aligned apertures 65 and 66 are provided radially through the collar 61 and sleeve 63 in communication with the interior of the reservoir housing 20.

The end wall 60 carries an inwardly projecting guide pin 67 having a diametrically reduced, threaded end portion 68 projecting through a suitable aperture in said end wall and secured by an outer nut 69. Said pin closely and slidably interfits a bore 70 which extends coaxially through the worm shaft 53 and the piston 54. Said piston reciprocates on the guide pin 67 from the end of the cylinder 64 adjacent to the end wall 60 to the broken line position shown at 54', in FIGURE 4, just beyond the apertures 65 and 66.

A fluid connector 71 is also mounted to the end wall 60 by means of a threaded end portion 72 disposed within a suitable threaded opening 73 in said end wall. Said connector carries one end of the connecting line 13, and a bore 74 allows passage of fluid from the cylinder 64 through the connector 71 to said connecting line.

A filler cap or plug 75 is provided in a suitable filler opening 76 in the top of the reservoir housing 20 for introducing hydraulic fluid "F" into said housing. The level of the fluid "F" is preferably a short distance below the plug 75 to afford an air space at the top of the reservoir housing 20. The fluid can enter the cylinder 64 through the apertures 65 and 66 whenever the piston 54 is in the fully retracted position shown at 54', and at such time, any air or other gaseous fluid which is trapped in the system escapes through said apertures to the air space at the top of the housing.

Figure 5:
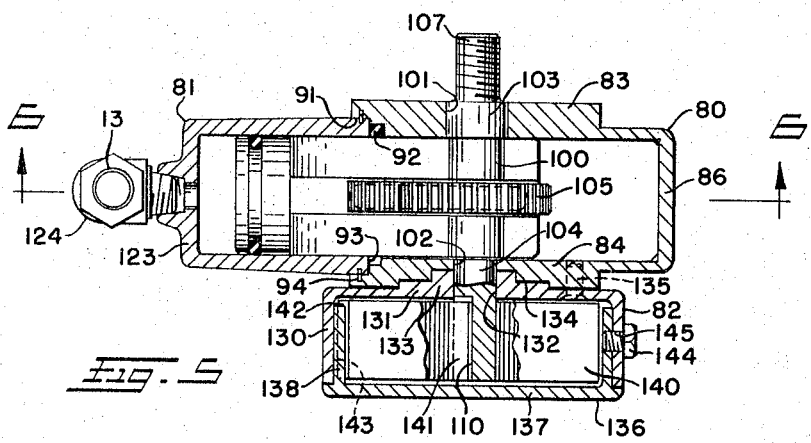
FIGURE 5 is a horizontal section through the slave component in its assembled condition.
Figure 6:
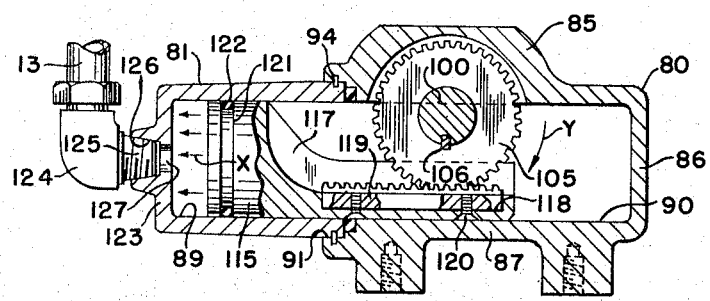
FIGURE 6 is a section taken along the line 6—6 of FIGURE 5.

Referring now to FIGURES 3, 5, and 6, the slave component 14 comprises a gear housing 80, a cylinder housing 81, and a spring housing 82. The gear housing 80 has side walls 83 and 84, a domed top wall 85, closed end wall 86 at one end thereof, and a bottom wall 87. Said bottom wall carries downwardly projecting, mounting bosses 88, and the end of the gear housing 80 opposite the end wall 86 is open to receive an open end of the cylinder housing 81. The cylinder housing 81 is bored to provide a cylinder 89 which is coaxial with and the same size as the bore 90 of the gear housing 80. A bore 91 in the open end of said gear housing provides a recess for receiving the open end of the cylinder housing 81, and a counterbore 92 provides a second recess which seats a sealing washer 93. The housings 80 and 81 are retained in their assembled condition by a snap ring 94.

An output shaft 100 is mounted in suitable bearing apertures 101 and 102 in the side walls 83 and 84 respectively, by means of journals 103 and 104 of said shaft. Said output shaft carries a gear 105 which projects upwardly into the domed top wall 85 and downwardly into the bore 90. A key 106 secures the gear 105 to the output shaft 100 for rotation therewith. Outwardly of the journal 103, the shaft 100 is provided with a threaded end portion 107 for insertion in a split, threaded bore portion 108 of the control arm 15, and a set screw 109 provides means for tightly securing said split bore portion upon said end portion 107. The journal 104 is elongated whereby it projects outwardly in the opposite direction beyond the side wall 84 and is provided at its outer end portion with a slot 110 for a purpose hereinlater to be fully described.

The cylinder 89 houses a piston 115 having an elongated body portion 116 which is generally semispherical in cross section to interfit said cylinder and the bore 90. The flat side of the body portion 116 is disposed upwardly and is longitudinally grooved at 117 to accommodate the lower edge portion of the gear 105. A recess 118 in the bottom of the groove 117 seats a rack 119 secured in place by screw 120. The gear 105 meshes with the rack 119 whereby longitudinal movement of the piston 115 causes rotation of the gear 105 and shaft 100 resulting in pivoting of the control arm 15.

The piston 115 is circumferentially grooved at its outer surface, as indiacted at 121, to reecive an O-ring 122 which seals the piston to the cylinder 89. The distal end of the cylinder housing 81 is enclosed by an end wall 123, and a fluid connector 124 is mounted therein by means of a threaded end portion 125 disposed in a threaded opening 126. A bore 127 allows passage of fluid "F" into the cylinder 89 between the end wall 123 and the piston 115. The connector 124 receives the opposite end of the connecting line 13 whereby movement of the master piston 54 effects movement of the slave piston 115.

The spring housing 82 is cup shaped, having a cylindrical wall 130 and a bottom wall 131, said bottom wall being apertured at 132 to fit over the outer portion of the journal 104. The outer surface of the bottom wall 131 is provided with an annular, stepped boss 133 which complementarily interfits a stepped recess 134 in the outer surface of the side wall 84, and screws 135 secure said wall 131 to the wall 84.

Means are provided for enclosing the open end or top of the spring housing 82 in the form of a cup shaped cap 136 having a top wall 137, an annular collar 138 slidably interfitting the cylindrical wall 130, and a radiating lip 139 overlapping the edge of said cylindrical wall. The spring housing 82 houses a coiled, clocktype spring 140, similar in form to the spring 45 of the master component, said spring 140 having a radially inwardly turned lip 141 and a radially outwardly projecting lip 42. The inner lip 141 is seated in the slot 110 of the journal 104, and the outer lip 142 is seated in a slot 143 provided in the inner surface of the collar 138. A set screw 144 projects through an aperture 145 in the cylindrical wall 130 and is threadfitted into an adjusting aperture 146 in the collar 138. Said collar is provided with a plurality of the adjusting apertures 146 whereby the cap 136 may be rotatively adjusted relative to the spring housing 82. By rotation of said cap, the spring 140 is pre-wound in a counter-clockwise direction sufficiently to counterbalance the clockwise prewinding of the spring 45.

The operation and function of the hydraulic motion transmitting system of this invention will be readily understood from the foregoing. As hereinabove stated, the spring 45 of the master component 12 is prewound to a determined torque in a clockwise direction whereby it resiliently urges the drive shaft 30 to rotate in a counter-clockwise direction. Said drive shaft, in turn, tends to urge the worm shaft 53 outwardly toward the end wall 60 thereby causing the piston 54 to press against fluid trapped between said piston and said end wall. At the same time, the counterclockwise prewound spring 140 of the slave component 14 urges the output shaft 100 in a clockwise direction whereby the gear 105 tends to drive the piston 115 outwardly toward the end wall 123. Said piston 115 is thereby caused to press against fluid trapped between said piston and the end wall 123. The fluid which is disposed in the connecting line 13 is thus pressurized by the resiliently urged pistons 54 and 115 as indicated by the small arrows "X" in FIGURES 4 and 6. The directions of bias by the springs 45 and 140 are similarly indicated by the larger arrows in FIGURES 2, 3, and 6.

The opposite, counterbalancing bias of the pistons 54 and 115 keeps the entire fluid system in a state of equilibrium as long as the wheel 11 is not rotated. A steering element, such as a rudder, which is responsive to the steering rod 16 will thereby be resiliently held in a neutral or straight-ahead position. It will be understood that the rudder or other steering element can be so connected to the steering rod 16 by conventional means as to cause the craft to turn either in the direction the steering wheel is turned or oppositely thereto if desired.

When the wheel 11 is turned clockwise or to the right, as indicated by the arrow "Z" in FIGURE 1, the threads 52 of the drive shaft 30 act upon the worm shaft 53 to retract said worm shaft and cause the piston 54 to move away from the end wall 60. The spring 45 is thereby wound even more tightly whereas the spring 140 of the slave component is enabled to unwind in a clockwise direction as the pressure is momentarily relieved on the fluid ahead of the piston 115. If the fluid between the pistons 54 and 115 be thought of as a column, it can be said that the fluid column shifts slightly from the slave component toward the master component thereby allowing the spring 140 to rotate the output shaft 100 clockwise, pivot the control arm 15 clockwise, and longitudinally move the steering rod 16 toward the right as seen in FIGURE 1. Any release in pressure on the fluid in either cylinder, such as may occur upon a sudden turn of the wheel, is immediately re-established by the action of the springs 45 and 140; and whenever one of said springs is unwound thereby reducing its tension, the other said spring is correspondingly wound thereby ensuring that the fluid between the pistons is maintained under pressure at all times during normal steering. This pressure prevents air from accumulating in the cylinders and the connecting line and ensures a positive reaction between the components.

As hereinabove pointed out in connection with the detailed description of the master component (FIGURE 4), the piston 54 is movable to the left as illustrated at 54′ beyond the apertures 65 and 66. This position of the piston 64 is attained when the wheel 11 is turned its fullest extent to the right or clockwise, and at this time air or other gaseous fluid passes out of the cylinder 64 while at the same time, hydraulic fluid "F" replaces it.

It will be readily seen that a reverse or counterclockwise movement of the wheel 11, as indicated by the arrow "Z" in FIGURE 1, causes the piston 54 to move outwardly thereby forcing the column of fluid to shift toward the slave component and retract the piston 115. At this time, the spring 45 is unwound, the gear 105 and output shaft 100 are rotated counterclockwise, the control arm 15 is pivoted counterclockwise, and the steering rod 16 is moved longitudinally toward the left as seen in FIGURE 1. Thus, the craft is steered in the opposite direction to that caused by a right-hand turn of the wheel.

The wheel 11 returns to the neutral or straight-ahead position from any turned position upon its release due to the counterbalancing effect of the prewound springs 45 and 140. This centering force affords the driver or helmsman with a proper feedback feel of the steered craft. However, sudden backlash is eliminated by the worm shaft arrangement because the worm flights will not drive the drive shaft but can only be driven thereby.

It will be understood that many changes in the details of this invention may be made without, however, departing from the spirit thereof or the scope of the appended claims.

What I claim is:

1. In a remote motion transmitting system, a master component comprising a rotatable drive shaft, a master cylinder means, a master piston disposed in said cylinder means, and means effecting longitudinal movement of said master piston in response to rotative movement of said drive shaft; a slave component comprising a rotatable output shaft, a slave cylinder means, a slave piston disposed in said slave cylinder means, and means effecting rotative movement of said output shaft in response to longitudinal movement of said slave piston; and a connecting line containing hydraulic fluid connected to both said cylinder means ahead of said pistons, whereby movement of said master piston effects a responsive motion of said slave piston through the medium of said hydraulic fluid, a pair of tensioned spring means connected to said drive shaft and said output shaft, respectively, and rotatively urging said shafts whereby said pistons exert pressure on said hydraulic fluid in said line.

2. In a remote motion transmitting system, a master component comprising a rotatable drive shaft, a master cylinder means, a master piston disposed in said cylinder means, and means effecting longitudinal movement of said master piston in response to rotative movement of said drive shaft; a slave component comprising a rotatable output shaft, a slave cylinder means, a slave piston disposed in said slave cylinder means, and means effecting rotative movement of said output shaft in response to longitudinal movement of said slave piston; a connecting line containing hydraulic fluid connected to both said cylinder means ahead of said pistons whereby movement of said master piston effects a responsive motion of said slave piston through the medium of said hydraulic fluid, a pair of prewound, clocktype, coil springs surrounding and connected to said drive shaft and said output shaft, respectively; and means maintaining said springs in their wound condition, said springs exerting such rotative effort on said shafts that said pistons exert pressure on said hydraulic fluid in said line.

3. A remote hydraulic steering apparatus comprising a rotatable drive shaft; a steering wheel mounted on one end of said drive shaft; means defining an axial bore opening at the opposite end of said drive shaft; a worm shaft being longitudinally movable in said bore; internal threads disposed on inner surface portions of said bore and engaging said worm shaft whereby rotation of said drive shaft longitudinally moves said worm shaft; a first piston carried by one end of said worm shaft outwardly of said bore; first housing means encasing said worm shaft and the end portion of said drive shaft opposite said steering wheel; said housing means including a first cylinder means encasing said first piston; an output shaft; a gear carried by said output shaft; a second piston having an elongated body portion; a rack carried by said body portion in mesh with said gear for rotating said gear in response to axial movement of said second piston; second housing means encasing said gear and including a second cylinder means encasing said second piston; one end portion of said output shaft projecting outwardly of said second housing means in one direction and carrying a control arm on the distal end thereof; a connecting line containing hydraulic fluid connected at its ends to said first and second cylinder means respectively, ahead of said first and second pistons whereby axial movement of said first piston, by rotation of said steering wheel, effects a responsive axial movement of said second piston thereby rotating said output shaft and pivoting said control arm; and a pair of tensioned spring means connected to said drive shaft and said output shaft, respectively, and rotatively urging said shafts whereby said pistons exert pressure in opposite directions on said hydraulic fluid in said lines.

4. A remote hydraulic steering apparatus as set forth in claim 3; said spring means comprising a first coiled, clocktype spring surrounding said drive shaft within said first housing means; said first spring being prewound and being connected to said drive shaft at its inner end and to said first housing means at its outer end to so bias said drive shaft as to urge said first piston against said fluid; a second coiled, clocktype spring surrounding a portion of said output shaft; and said second spring being prewound and being connected to said output shaft at its inner end and fixed relative to said second housing means at its outer end to so bias said output shaft as to urge said second piston against said fluid.

5. A remote hydraulic steering apparatus as set forth in claim 4; said output shaft projecting outwardly of said second housing means in the opposite direction and carrying said second spring thereon; said housing means including a spring housing mounted rigidly thereto, the outer end of said second spring connected to said spring housing.

6. A remote hydraulic steering apparatus as set forth in claim 5; said spring housing comprising a first annular, cup shaped portion fixed to said second housing means; a second annular, cup shaped portion interfitting and rotatable with respect to said first cup shaped portion; said second spring connected to said second cup shaped portion; and set screw means maintaining said second cup shaped portion in a predetermined rotated position with respect to said first cup shaped portion.

7. A remote hydraulic steering apparatus as set forth in claim 3; said first piston being movable to a fully retracted position in a portion of said first cylinder means; said first housing means providing a reservoir containing hydraulic fluid and encasing said portion of said first cylinder means with the level of said hydraulic fluid being above said portion; means defining apertures in said portion providing fluid passage means between said first cylinder means and said reservoir, said first piston being disposed behind and uncovering said apertures in said fully retracted position whereby hydraulic fluid from said reservoir can enter said first cylinder means ahead of said first piston and gaseous fluid ahead of said first piston can enter said reservoir.

References Cited by the Examiner
UNITED STATES PATENTS

| | | | |
|---|---|---|---|
| 1,092,397 | 4/1914 | Riley | 60—54.5 |
| 1,633,463 | 6/1927 | Sperry | 60—54.5 |
| 2,219,844 | 10/1940 | Lotter et al. | 60—54.6 X |
| 2,243,385 | 5/1941 | Levy | 60—54.5 |
| 2,338,965 | 1/1944 | Parsons | 60—54.6 |
| 2,737,021 | 3/1956 | Edge et al. | 60—54.5 |

MARTIN P. SCHWADRON, *Primary Examiner.*

ROBERT R. BUNEVICH, *Examiner.*